US 7,648,071 B2

(12) United States Patent
Tsutsumi

(10) Patent No.: US 7,648,071 B2
(45) Date of Patent: Jan. 19, 2010

(54) APPARATUS FOR IMAGE READING AND METHOD FOR SETTING THE IMAGE READING

(75) Inventor: Kazuyoshi Tsutsumi, Numazu (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 634 days.

(21) Appl. No.: 11/400,584

(22) Filed: Apr. 7, 2006

(65) Prior Publication Data

US 2007/0235542 A1    Oct. 11, 2007

(51) Int. Cl.
*G06K 7/10* (2006.01)
(52) U.S. Cl. .............. 235/454; 235/462.17; 235/462.23
(58) Field of Classification Search ................. 235/454, 235/462.17, 462.23, 462.24
See application file for complete search history.

(56) References Cited

U.S. PATENT DOCUMENTS

| 5,900,927 | A | * | 5/1999 | Hasegawa | ................... 356/3.13 |
| 2002/0069550 | A1 | * | 6/2002 | Noguchi et al. | ................ 33/623 |
| 2003/0129507 | A1 | * | 7/2003 | Tashiro et al. | .................. 430/21 |
| 2006/0027825 | A1 | * | 2/2006 | Kuriyama | ..................... 257/98 |
| 2006/0204099 | A1 | * | 9/2006 | Kimura | ....................... 382/182 |

* cited by examiner

*Primary Examiner*—Ahshik Kim
(74) *Attorney, Agent, or Firm*—Turocy & Watson, LLP

(57) ABSTRACT

According to an embodiment, there are achieved an apparatus for image reading and a setting method for the apparatus with which adjusting workability is enhanced, an adjusting time is shortened and focusing of a 4-line CCD sensor as an optical sensor is set to the averagely best state. This embodiment is equipped with an optical sensor having plural line sensors having different numbers of pixels, a condenser lens for projecting an optical image to the optical sensor, and an adjusting mechanism for setting the distance between the condenser lens and the optical sensor so that the resolution of the line sensor having the largest number of pixels is highest among the plural line sensors.

10 Claims, 12 Drawing Sheets

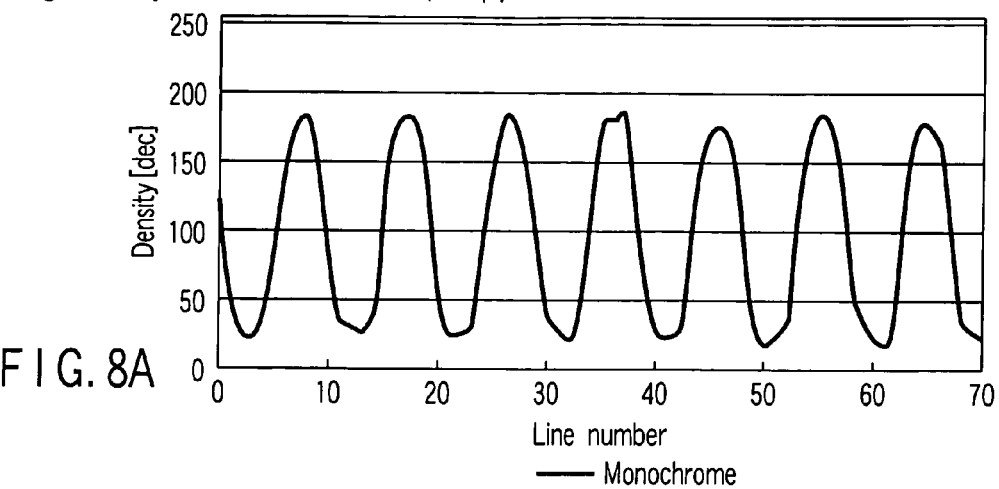
FIG. 8A  Image read by monochromatic sensor (600dpi)
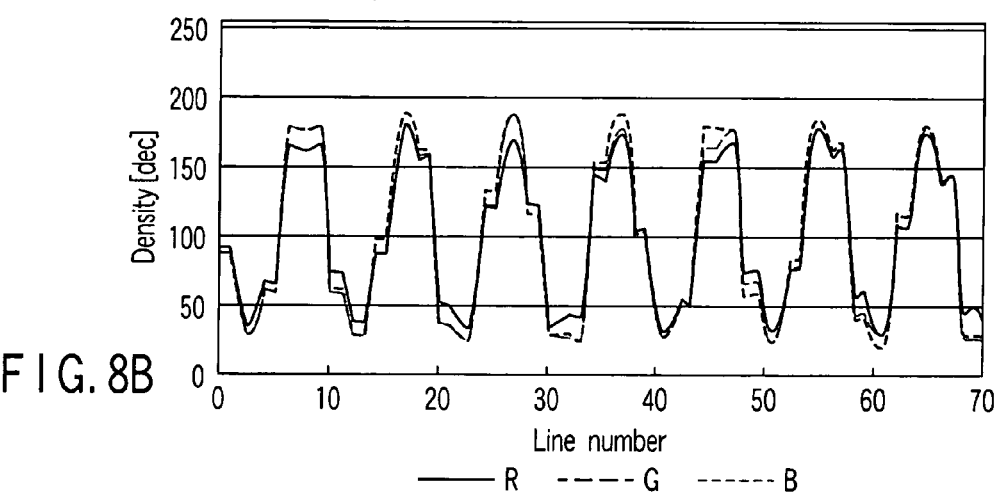
FIG. 8B  Image read by color sensor (300dpi)
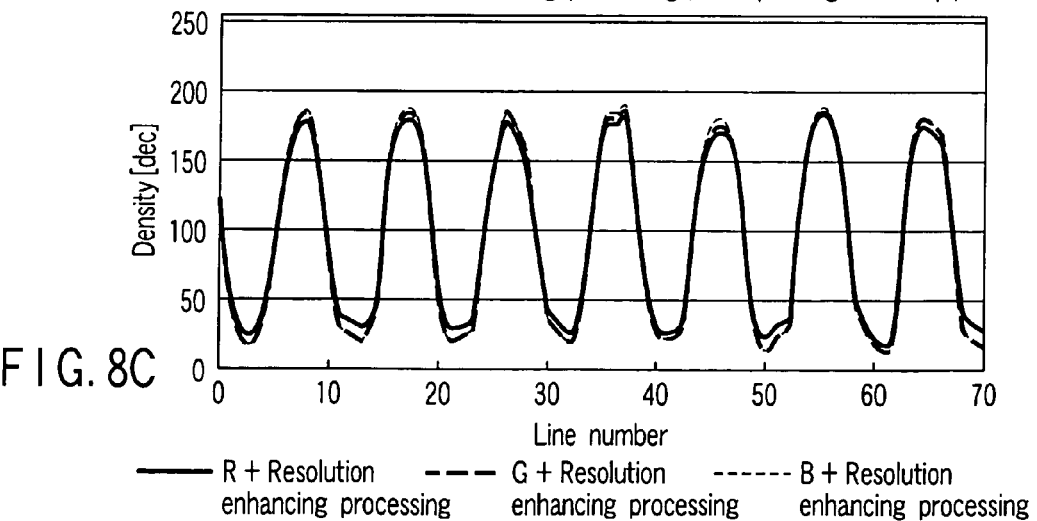
FIG. 8C  Image read by color sensor + resolution enhancing processing (corresponding to 600dpi)

Image read by monochromatic sensor (600dpi)

— Monochrome

Image read by color sensor (300dpi)

——— R    — — — G    ------ B

Image read by color sensor + resolution enhancing processing (corresponding to 600dpi)

——— R + Resolution    — — — G + Resolution    ------ B + Resolution
enhancing processing    enhancing processing    enhancing processing

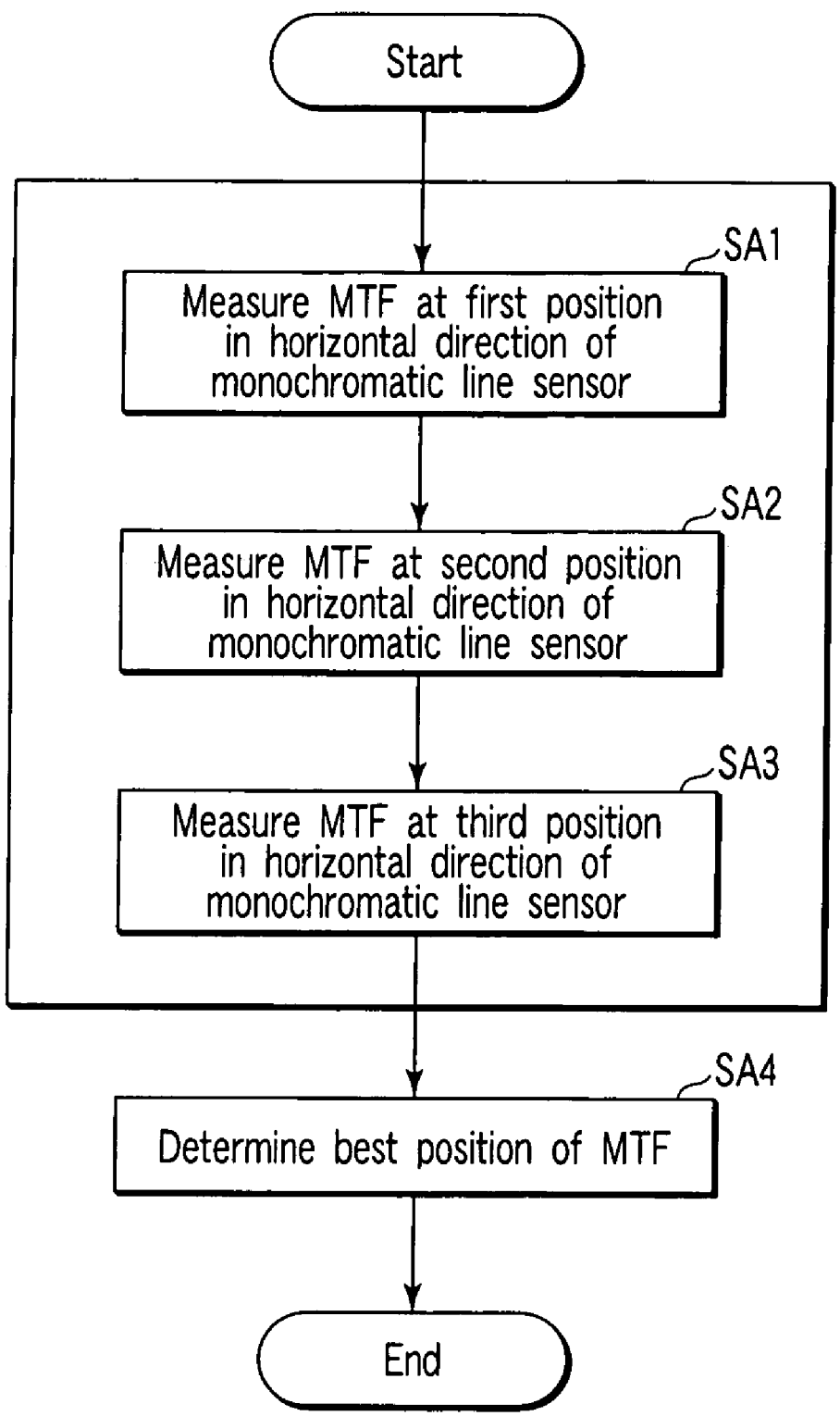
F I G. 13

APPARATUS FOR IMAGE READING AND METHOD FOR SETTING THE IMAGE READING

BACKGROUND OF THE INVENTION

1. Field of the Invention

An embodiment of the present invention relates to an apparatus for image reading and a method for setting the image reading. The apparatus and the method are suitably applied to an image reading apparatus for optically reading an original by a scanner, and also suitably applied to a digital copying machine for forming an image on the basis of read image data, etc.

2. Description of the Related Art

A 3-line CCD sensor constructed by three lines of RED, GREEN, BLUE has been hitherto adopted as an optical sensor for color image reading. The 3-line CCD sensor is designed so that color filters of RED, GREEN, BLUE are disposed on respective light receiving faces of three line sensors, and the three line sensors are arranged in parallel.

Recently, 4-line CCD sensors have been commercially produced. The 4-line CCD sensor is equipped with a monochromatic reading line sensor for reading a monochromatic image in addition to the 3-line CCD sensor. In the 3-line CCD sensor, each of the line sensors has a color filter that transmits only light having a specific wavelength therethrough and disposed on the corresponding light receiving face. In comparison with the 3-line CCD sensor, the monochromatic reading line sensor has no color filter disposed on the light receiving face thereof. Japanese Patent Application Publications (KOKAI) No. 2004-272840, No. 2004-180196 and No. 2003-274115 are known as documents showing techniques relating to CCD sensors.

In the 4-line CCD sensor, the four line sensors are disposed so as to be spaced from one another at intervals in the scanning direction of an original. Therefore, it is impossible that all the line sensors simultaneously read the same place of the original. Furthermore, it is impossible to match the focal point of a condenser lens to all the line sensors at the same time.

Therefore, according to the image reading apparatus having the 4-line CCD sensor, focus adjustment for images to be read by the RGB line sensors for color is carried out, and then focus adjustment for an image to be read by the monochromatic line sensor. When the focusing state achieved when the image reading is carried out by the color RGB line sensors is caused to be out of focus by the focus adjustment for the image to be read by the monochromatic line sensor, the focus adjustment when the image reading is carried out by the color RGB line sensors is carried out again. As described above, such balanced adjustment that the focusing conditions for both color and monochrome are set to averagely optimal focus positions is repetitively carried out.

However, the above-described method increases the adjustment time because of repetitive re-adjustment and also requires the adjustment to set the focusing positions for both the color and monochrome to the averagely optimal ones, so that the adjustment concerned finally sacrifices the image performance inherent to the lens.

BRIEF SUMMARY OF THE INVENTION

Therefore, an embodiment of the present invention has an object to provide an apparatus for image reading and a method of setting the image reading that can enhance adjustment workability, shorten an adjustment time and set the focusing state of a 4-line CCD sensor to an averagely best state.

The above-described embodiment includes an optical sensor having plural line sensors having different numbers of pixels, a condenser lens for projecting an optical image to the optical sensor, an adjustment mechanism for setting the distance between the condenser lens and the optical sensor so that the resolution of the line sensor having the largest number of pixels out of the plural line sensors is highest.

Additional objects and advantages of the embodiments will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 8A is a diagram showing an example of an image read by a high resolution sensor for monochrome that is adjusted by the adjusting method shown in FIG. 5;

FIG. 8B is a diagram showing an example of an image read by a low resolution RGB sensor for color that is adjusted by the adjusting method shown in FIG. 5;

FIG. 8C is a diagram showing an image as a result of composition of images of FIGS. 8A and 8A;

FIG. 13 is a flowchart showing the procedure of the focus adjustment.

DETAILED DESCRIPTION OF THE INVENTION

Embodiments according to the present invention will be described with reference to the drawings.

Figure 1:
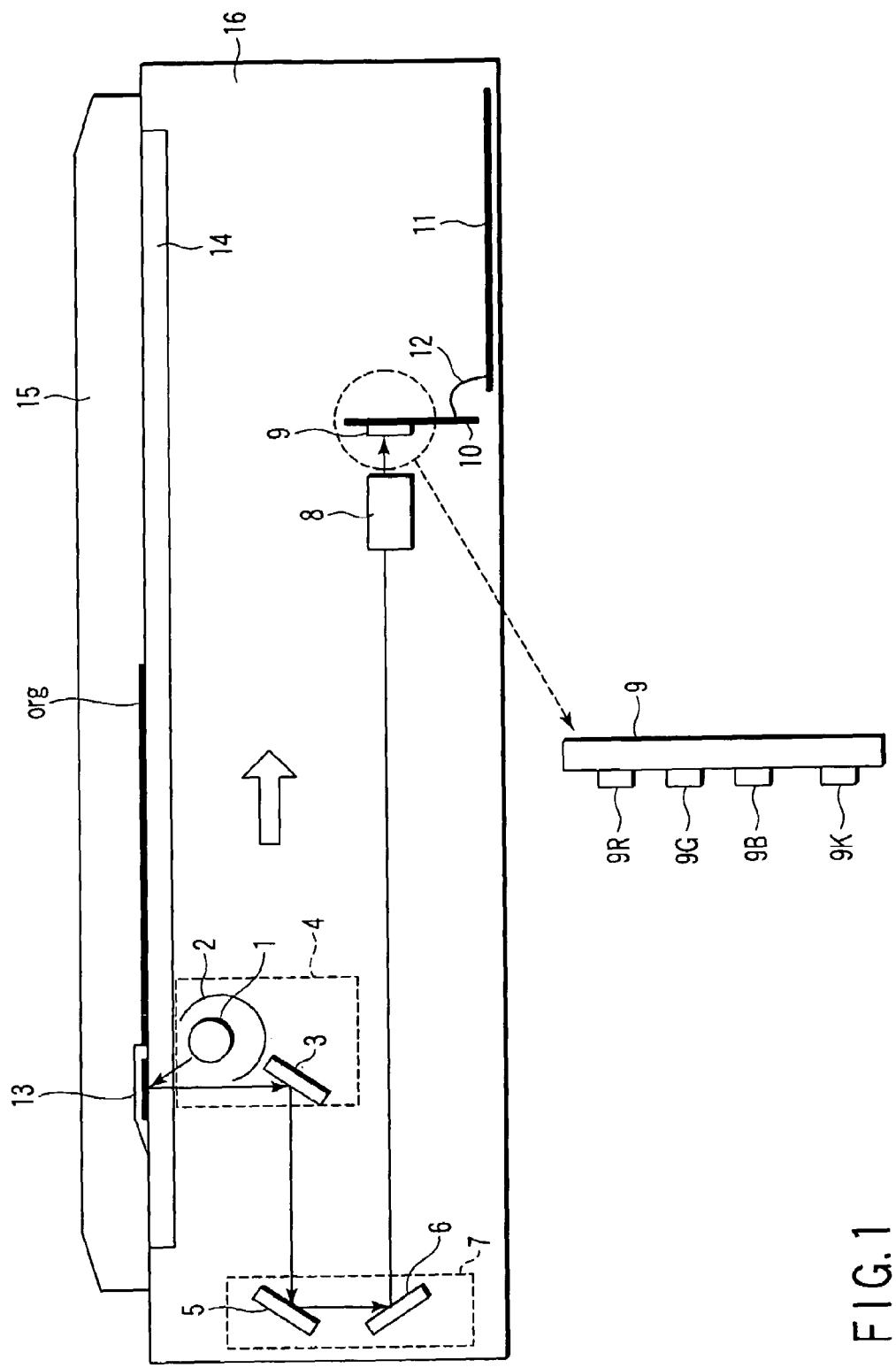
FIG. 1 is a diagram showing the schematic construction of an image input device using a CCD line sensor.

FIG. 1 shows the schematic construction of an image input device using a CCD line sensor.

A scanner serving as the image input device has a first carriage 4, a second carriage 7, a condenser lens 8, a CCD sensor board 10, a control board 11, a white reference plate 13, an original glass 14, an original press cover 15 and a scanner housing 16.

The first carriage 4 has a light source 1, a reflector 2 for correcting the light distribution characteristic of the light source 1, and a first mirror 3. The second carriage 7 has a second mirror 5 and a third mirror 6. A 4-line CCD sensor 9 is mounted on the CCD sensor board 10. The 4-line CCD sensor 9 has R, G and B line sensors 9R, 9G and 9B for color (hereinafter referred to as color line sensors) and a line sensor 9K for monochrome (hereinafter referred to as monochromatic line sensor) arranged in parallel.

A circuit for executing the control of the 4-line CCD sensor 9 and various kinds of processing is mounted on the control board 11. The white reference plate 13 is used as a reference for white color. An original org is placed on the original glass 14, and the original press cover 15 presses the original org so that the original org is not floated.

This apparatus is based on the relationship between the condenser lens 8 and the 4-line CCD sensor 9. First, the operation of the scanner will be described with reference to FIG. 1.

Light irradiated from the light source 1 is transmitted through the original glass 14, and irradiated onto the original org. Furthermore, the light distribution of the light irradiated from the light source 1 is not uniform, and unevenness in light distribution occurs in illumination intensity on the original org. Therefore, the reflection light from the reflector 2 is also irradiated to the original org, so that the light distribution on the original org is uniform.

The reflection light from the original org is reflected from the first mirror 3, the second mirror 5 and the third mirror 6, transmitted through the condenser lens 8 and focused onto the light receiving face of the CCD sensor 9. The 4-line CCD sensor 9 is mounted on the CCD sensor board 10, and controlled by a control signal input from the control board 11. The control board 11 and the CCD sensor board 10 are connected to each other through a harness 12.

The original press cover 15 presses the original org placed on the original glass 14 so that the reading face of the original org is brought into close contact with the original glass 14.

An analog signal output from the 4-line CCD sensor 9 contains high frequency distortion caused by the dispersion of the conversion efficiencies of respective photoelectric converters and low frequency distortion comprising aberration caused by use of a demagnification optical system using the condenser lens 8. Therefore, data serving as a reference for carrying out normalizing correction of the analog signal are required. In FIG. 1, the reference data concerned are set to image data when the white reference plate 13 is read.

In the conventional image reading apparatus (or scanner) having the 4-line CCD sensor, all of the RGB and monochromatic line sensors have the same number of pixels (resolution), and the images read by the line sensors are combined with one another to form an image. Therefore, all the focusing conditions for the respective line sensors are required to be set to the best positions.

Figure 2:
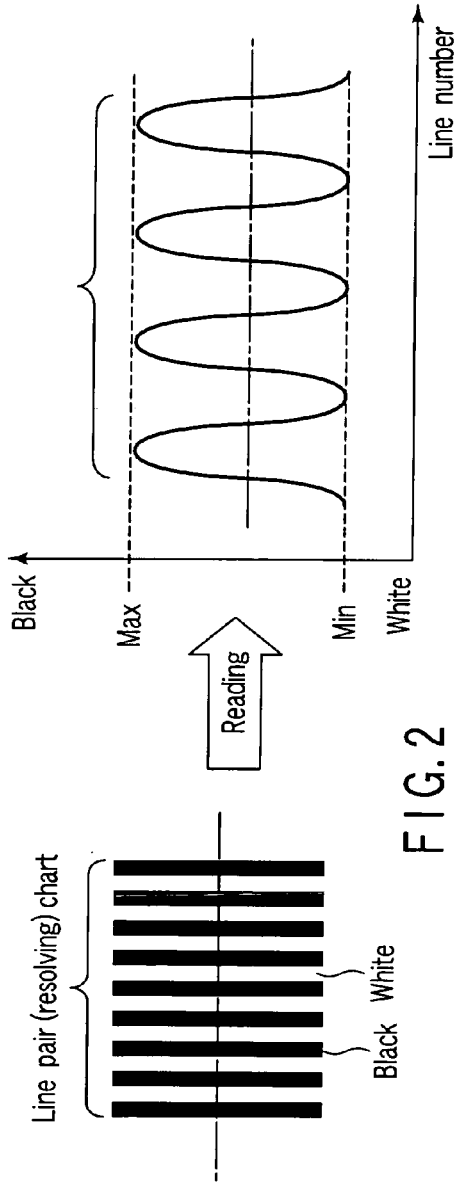
FIG. 2 is a diagram showing the relationship between a line pair (resolving) chart and the output of the CCD sensor.

The conventional focus adjusting method will be described with reference to FIGS. 2 to 5A and 5B. When the focus adjustment is carried out, a line pair (resolving) chart as shown in FIG. 2 is used. The line pair chart is a black and white stripe pattern. The line pair (resolving) chart is read by the CCD sensor 9. The amplitude of a sine wave achieved from a read-out signal is observed. The distance between the CCD sensor 9 and the condenser lens 8 is finely adjusted, and the position of the CCD sensor 9 is adjusted so that the amplitude of the sine wave is maximum.

That the amplitude of the sine wave is maximum means that the contrast of white and black is large, and what is achieved by numerically expressing the level of the contrast is called as MTF (Modulation Transfer Function).

The MTF is represented by the following equation:

$$MTF[\%]=\{(Min-Max)/(Max+Min)\}\times 100$$

* See FIG. 2 for Max, Min of contrast

Figure 3B:
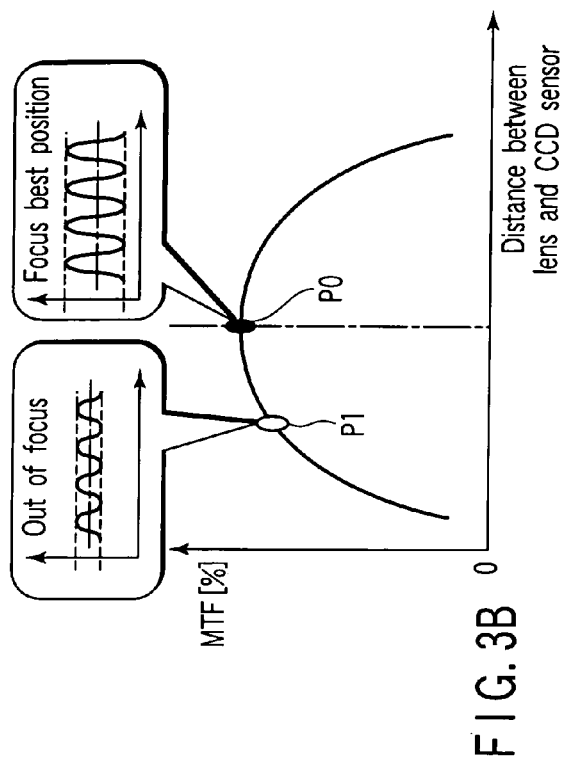
FIG. 3B is a diagram showing an MTF curve.
Figure 3A:
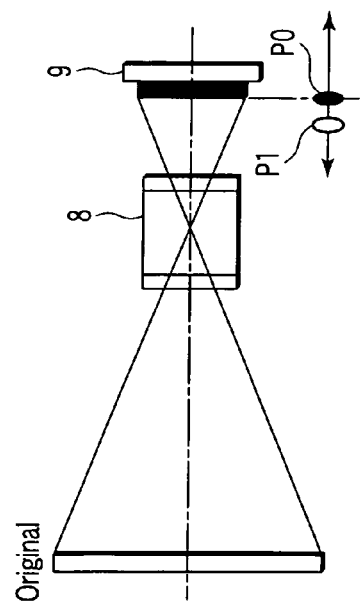
FIG. 3A is a diagram showing the positional relationship between the condenser lens and the CCD sensor.

The imaging performance of the lens is determined by the positional relationship between the lens 8 and the CCD sensor 9 as shown in FIG. 3A, and it provides such a curve (MTF curve) that MTF is maximum at the focusing best position as shown in FIG. 3B. P0 represents the focusing best position, and P1 represents an out-of-focus position.

The positions of the CCD sensors should be adjusted so that all MTFs of the four line sensors are maximum, however, it is impossible to set all the positions to the same position because of the effects of the imaging performance of the lens and warp of the chips of the CCD sensors themselves.

Figure 4B:
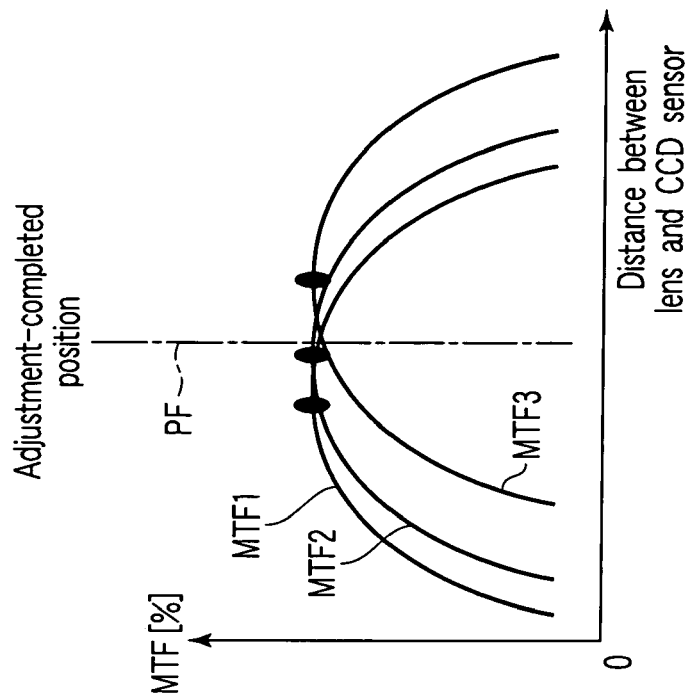
FIG. 4B is a diagram showing MTF1, MTF2, MTF3 every image focus location (image height) in the line direction (horizontal direction) of the line sensor.
Figure 4A:
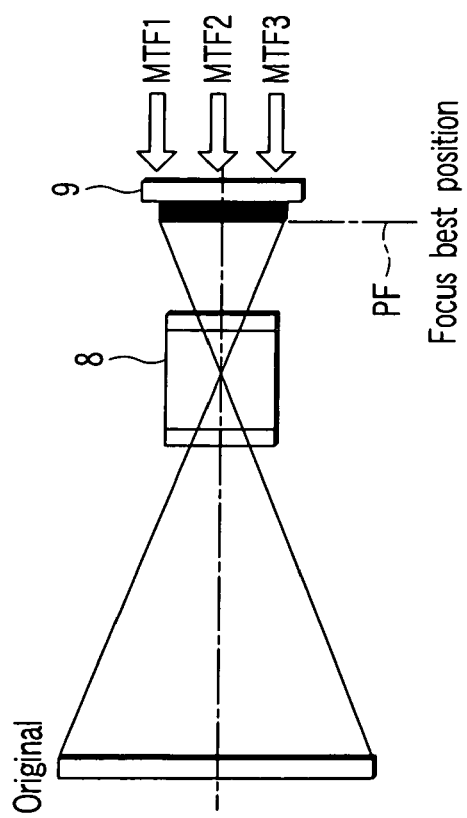
FIG. 4A is a diagram showing the positional relationship between the condenser lens and the CCD sensor.

Therefore, as shown in FIGS. 4A and 4B, the focus position is adjusted to a position (adjustment-completed position PF1) at which the balance among all MTF1, MTF2 and MTF3 achieved at respective imaging locations (image heights) along the line direction of the line sensor (for example, the R line sensor) are best while MTF1, MTF2 and MTF3 are simultaneously viewed although the maximum position of each MTF is somewhat sacrificed.

Figure 5A:
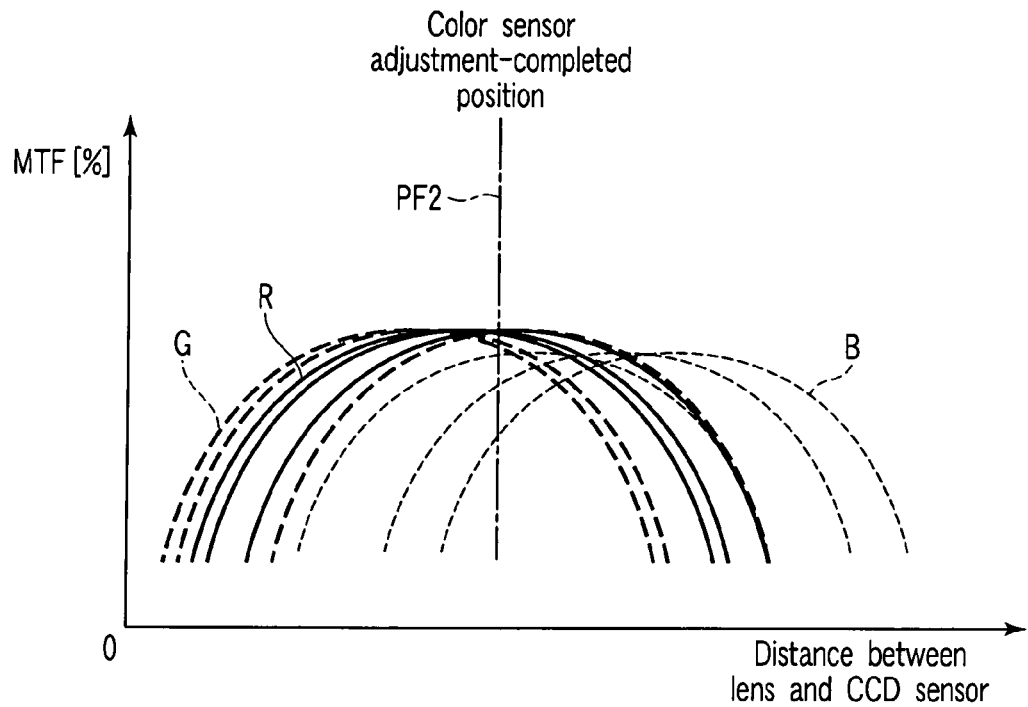
FIG. 5A is a diagram showing measurement results of MTF curves of MTF of an R line sensor (heavy broken line R), MTF of a G line sensor (solid line G) and MTF of a B line sensor (thin broken line B)

Particularly with respect to the three line sensors for color, these sensors are aligned with one another, and thus the positions of the line sensors are adjusted so that all the MTFs of RGB are best balanced. That is, as shown in FIG. 5A, MTF of the R line sensor (heavy broken line R), MTF of the G line sensor (solid line G) and MTF of the B line sensor (thin broken line B) are measured, and the distance between the lens and the CCD sensor at which the MTFs of RGB are balanced is set to an adjustment completion position PF2.

Figure 5B:
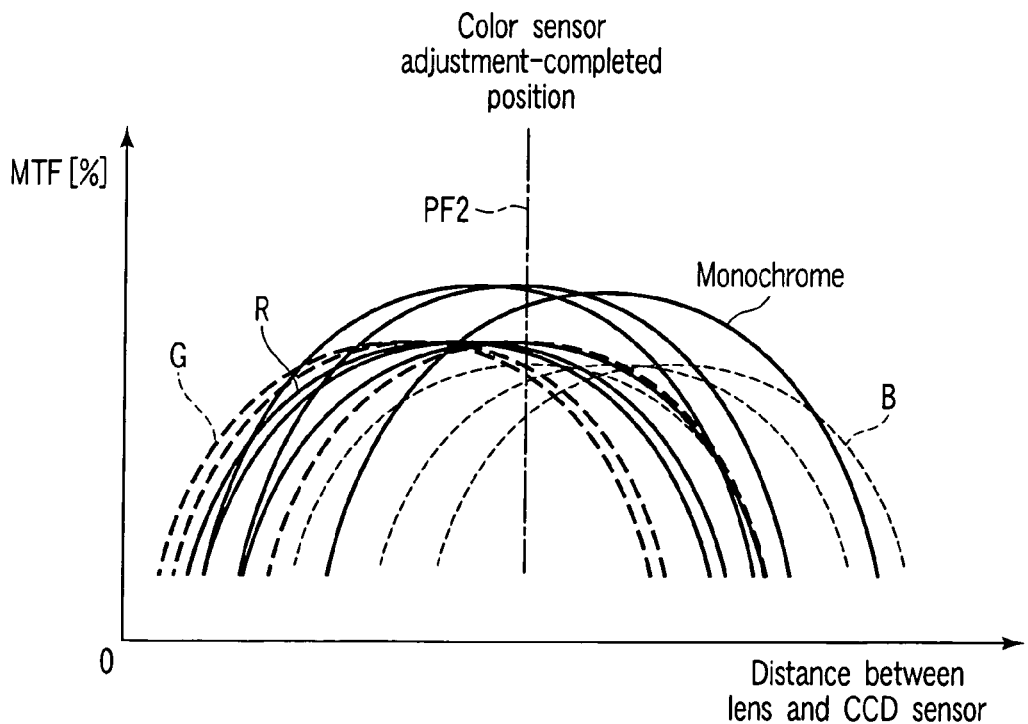
FIG. 5B is a diagram showing measurement results achieving by adding the measurement results of FIG. 5A with a measurement result (solid line K) of MTF of an image read by a monochromatic line sensor.

Furthermore, in the 4-line CCD sensor 9, after the focus adjustment is carried out on the three line sensors for color, the focus adjustment is carried out according to the procedure so that MTF (solid K) of the image read by the monochromatic line sensor is maximum as shown in FIG. 5B.

However, the focus condition for the color line sensors may be broken because the focus is matched to the focus position for the monochromatic line sensor. In this case, the image is read by the color line sensors again, and the balanced adjustment is repetitively carried out again and again while the color/monochromatic images are repetitively and alternately switched to each other so that the amplitudes of both the color/monochromatic images are highest, thereby achieving a final adjustment-completed position PF3.

However, the adjustment based on the above-described method causes increase in adjustment time because of repetitive re-adjustment and also requires that the focus positions for color and monochrome must be adjusted to the position at which the focusing balance is best. The adjustment may finally sacrifice the imaging performance inherent to the lens.

In view of the above-described technique, the present invention provides focus adjusting means in a scanner having two or more line sensors having different numbers of pixels.

Returning to FIG. 1, the 4-line CCD sensor 9 will be described again. The 4-line CCD sensor 9 is an example of the two or more line sensors having different numbers of pixels, and it has color filters and resolution shown in the following Table 1.

| TYPE | COLOR SENSITIVITY FILTER | NUMBER OF LINES | RESOLUTION |
|---|---|---|---|
| MONOCHROME | NO | 1 | 600 dpi |
| COLOR | RED COLOR FILTER (Red) | 1 | 300 dpi |
|  | GREEN COLOR FILTER (Green) | 1 | 300 dpi |
|  | BLUE COLOR FILTER (Blue) | 1 | 300 dpi |

The 4-line CCD sensor shown in the above table reads a monochromatic image by a high-resolution sensor of 600 dpi, and reads a color image by each low-resolution sensor of 300 dpi.

The following technique may be used as a color resolution enhancing image processing technique that actively uses the characteristic of the 4-line CCD sensor thus constructed. According to the image processing of this technique, only color information is extracted from color images read by low-resolution three line sensors for color, and an image is created on the basis of image information which is simultaneously read by one high-resolution monochromatic line sensor, thereby creating a clear and high-resolution color image.

An example will be described with reference to FIG. 6. A color image is created by superposing all the signals of the RGB and monochromatic line sensors.

Figure 6:
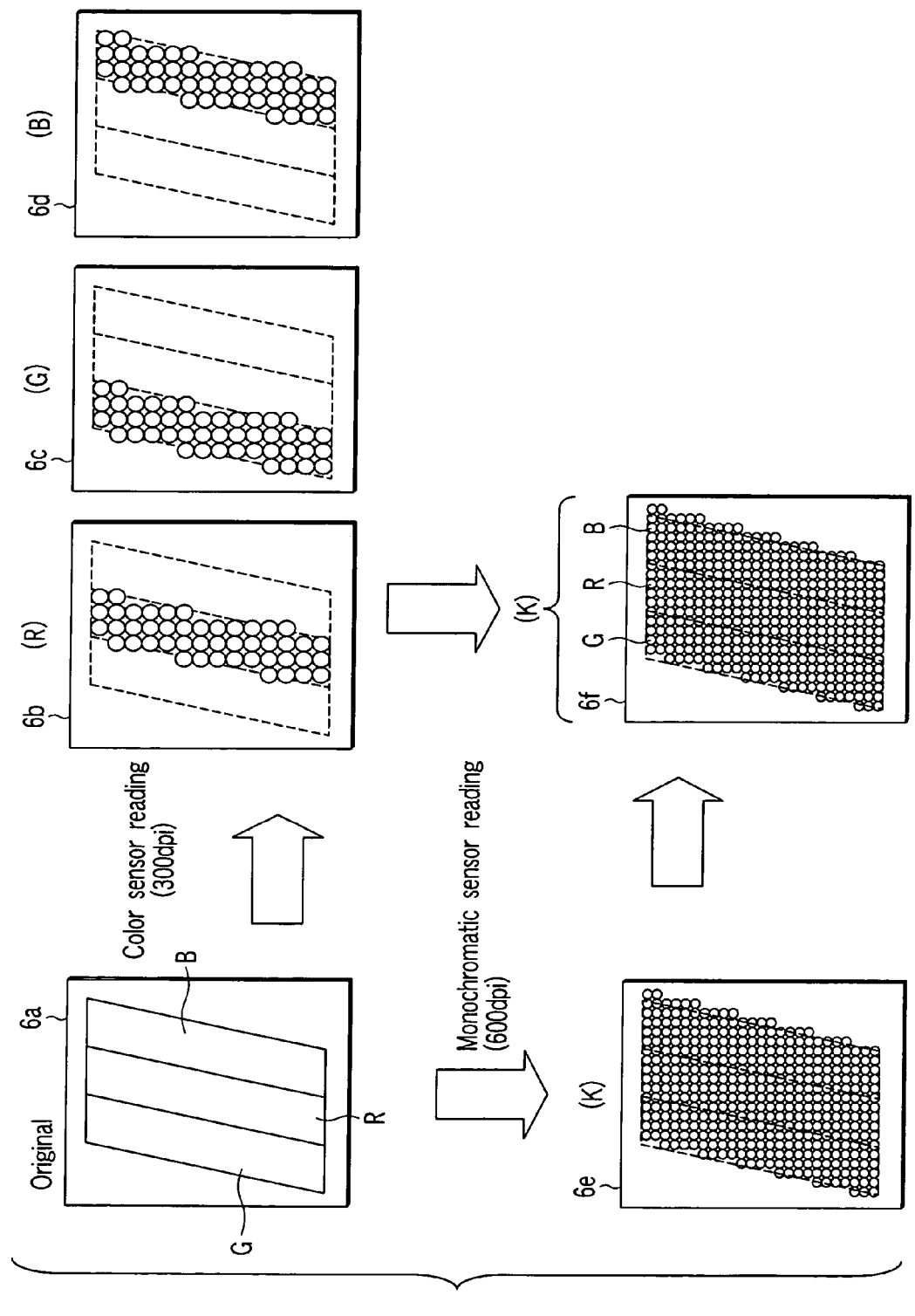
FIG. 6 is a diagram showing an image processing technique of enhancing color image resolution by actively using the characteristic of the 4-line CCD sensor.

When the original 6a as shown in FIG. 6 is read, it is decomposed like image signals 6b, 6c, 6d and 6e. The color images 6b, 6c, 6d are read by the low-resolution sensors having a small number of pixels, and thus the outline information thereof is roughly read like the image signals 6b, 6c, 6d. On the other hand, the monochromatic image read by the high-resolution sensor having a large number of pixels has detailed outline information like 6e.

The color information of the image read by the color line sensors is superposed on the outline information of the image read by the monochromatic line sensor, whereby a high-resolution color image can be created as shown in FIG. 6f.

Since this image processing technique is used, the precision to the outline information of the image read by the monochromatic line sensor is weighted as being necessary and important. That is, the focus adjustment to the monochromatic line sensor must be surely performed. On the other hand, the images read by the color line sensors are originally read by the low-resolution sensors each having a small number of pixels. Therefore, it is sufficient only to achieve color information, and the same level of MTF performance as the image read by the monochromatic line sensor is not required to the images read by the color line sensors. The present invention effectively makes active use of this concept.

Therefore, according to this embodiment, the MTF performance is not required, that is, the focus position adjusting precision is not required to images read by the color low-resolution line sensors. However, the focus adjustment is carried out on images read by the monochromatic high-resolution line sensor. Accordingly, the difficulty in adjustment is alleviated, and the adjustment time is shortened. Furthermore, the focusing precision in the adjustment of the monochromatic line sensor can be prevented from being lowered because the best focusing position is absolutely required to be searched in the adjustment of the color line sensors.

Figure 7A:
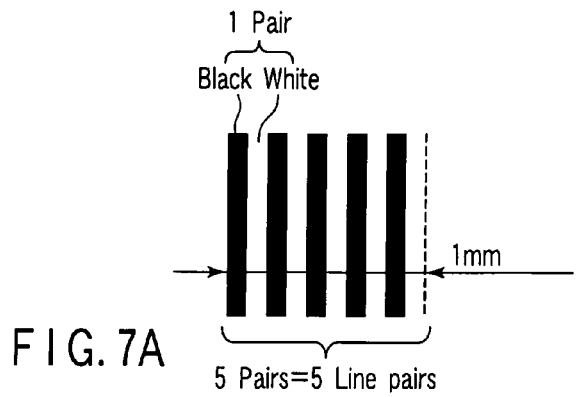
FIG. 7A is a diagram showing a 5 line-pairs chart.

An example of the optimal original pattern in the focus adjustment according to this embodiment will be described with reference to FIGS. 7A, 7B and 7C. The focus adjustment is carried out by varying the positional relationship of the line sensor to the lens as described above.

At this time, as the original to be read by the line sensor must be used an original with which it can be identified whether the line sensor exerts the image resolution.

A case where a line pair pattern is used to grasp the resolving level will be described.

The line pair pattern is an original pattern arranged while lines of white and black are paired every predetermined width. For example, $$5 \text{ line-pairs pattern} = \text{five pairs of white and}$$
$$\text{black exists in 1 mm as}$$
$$\text{shown in FIG. 7A.}$$
$$= 1/(5*2)$$
$$= 0.1 \text{ mm}$$

The line width of the 5 line-pairs pattern is set to 0.1 mm.

In this embodiment, the focus adjustment is carried out on the basis of the data read by the high-resolution line sensor of 600 dpi, and thus the limit resolution is as follows:

$$600 \text{ dpi} = 25.4 \text{ mm}/600$$
$$= 0.0423 \text{ mm}$$

The minimum line pair pattern corresponding to one pixel of 600 dpi is equal to $$1/(0.0423*2) = 11.8 \text{ line pairs}.$$

Accordingly, the focusing degree can be identified with the highest precision by reading the resolving chart of 11.8 line pairs.

Figure 7B:
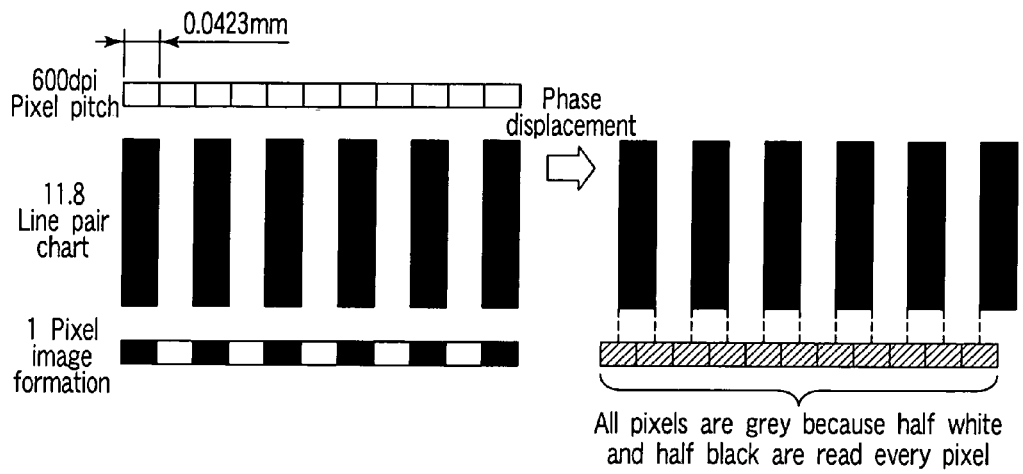
FIG. 7B is a diagram showing a 11.8 line-pairs chart which is considered for a line sensor of 600 dpi.

However, in a case where a white and black line pair pattern is disposed every pixel as shown in FIG. 7B, for example when the phase displacement corresponding to 0.5 pixel occurs between the original and the line sensor, a half white and a half black are read as data to be imaged at each pixel. In such a case, each pixel is identified as gray color and thus the line pair pattern cannot be resolved.

Therefore, this embodiment uses the minimum line pair pattern corresponding to two pixels of 600 dpi.

Figure 7C:
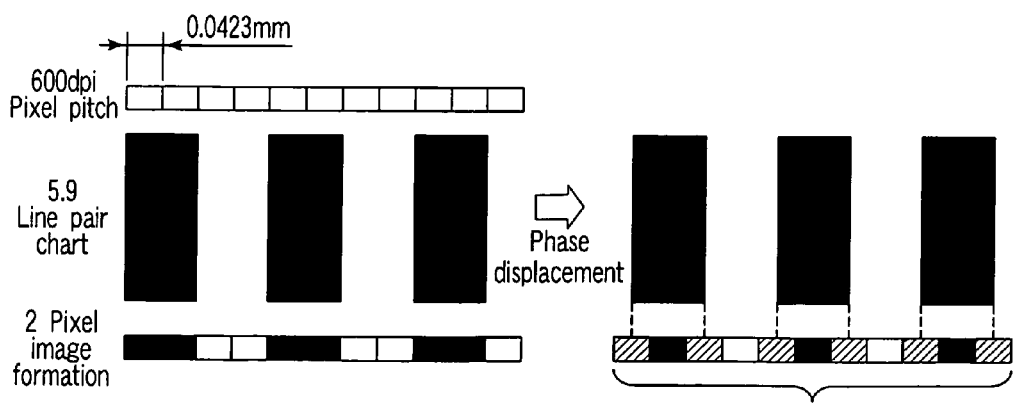
FIG. 7C is a diagram showing a 5.9 line-pairs chart suitable for a line sensor of 600 dpi.

The minimum line pair pattern of two pixels of 600 dpi is as shown in FIG. 7C. That is, 1/((25.4/600)*2*2)=5.9 line pairs.

In the case of 5.9 line-pairs pattern, any one of white and black is imaged at each pixel at all times even when the phase displacement corresponding to 0.5 pixel described above occurs. Therefore, it is possible to grasp resolving power. That is, all-black state or all-white state as described with reference to FIG. 7B does not occur due to the phase displacement between the pixel pitch and the line pair chart.

However, when the pixel pitch and the line pair pattern are made coincident with each other, the data thereof interfere with each other, so that it is considered that the quantitative resolving power cannot be measured.

In this case, it may be considered as an application of this embodiment that the line pair pattern is intentionally made not to be matched with the resolution of the line sensor.

Graphs of FIGS. 8A to 8C show images corresponding to the amplitude of a sine wave extracted from a read signal which is achieved by reading some fixed line pair pattern, that is, the MTF level. This image is an example of the image adjusted by the adjusting method described with reference to FIG. 5B.

FIG. 8A shows an image read by the monochromatic high-resolution sensor, and FIG. 8B shows an image read by the color low-resolution RGB sensors. According to the adjusting method shown in FIG. 5B, both the outputs from the low-resolution RGB sensors for color and the output from the high-resolution sensor for monochrome are adjusted. Accordingly, both the outputs are adjusted to the extent that both the color image data and the monochromatic image data suffer the same degree of sacrifice.

Both the color image data and the monochromatic image data provide the same amplitude. However, it is found that an effect of the output of the low-resolution sensor appears as shown in FIG. 8B and the shape of the waveform is stepwise varied (rough).

The image data read by the color RGB sensors are corrected by the color resolution enhancing processing, and the corrected result is shown in FIG. 8C.

It is found that the overall amplitude of FIGS. 8A and 8C is unvaried, however, the shape of the amplitude waveform is smoothened as a result of the resolution enhancing processing.

Figure 9:
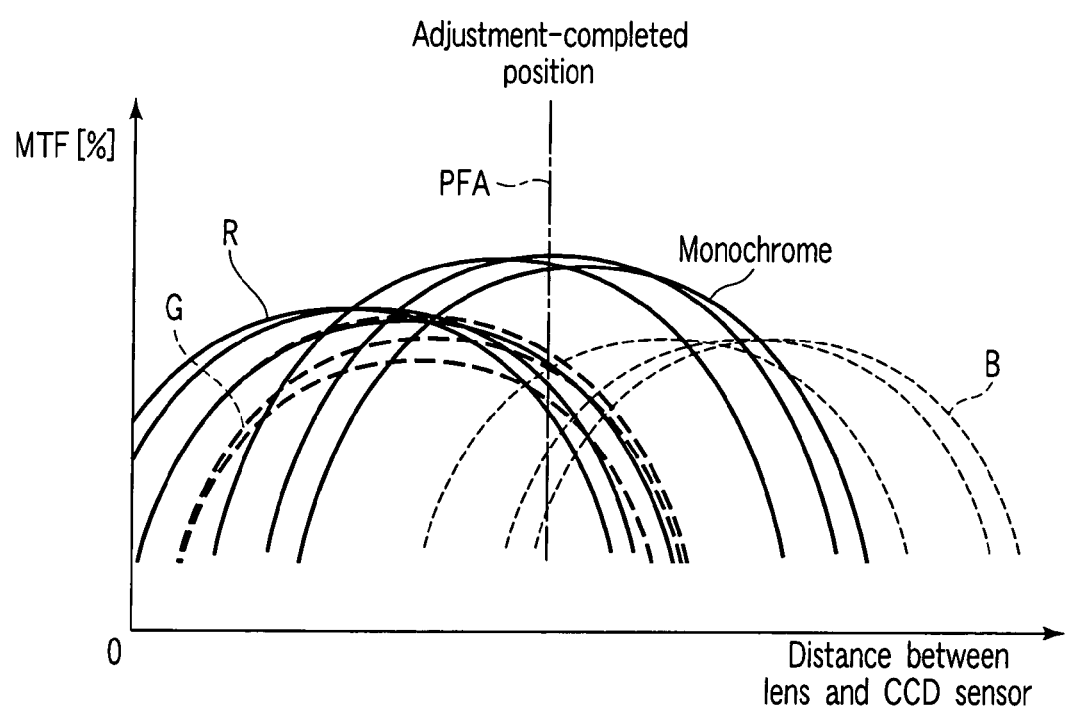
FIG. 9 is a diagram showing each sensor MTF curve when only monochromatic line sensor is adjusted in the 4-line CCD sensor.

FIG. 9 shows MTF when the line pair chart shown in FIG. 7C is used and the focus adjustment is carried out on the image read by the high-resolution line sensor for monochrome. No MTF performance is required to the image read by the low-resolution line sensor for color. Accordingly, the difficulty of the adjustment is alleviated and the adjustment time is shortened. As a result, the difference between the maximum level of MTF of the high-resolution monochromatic line sensor and the maximum level of MTF of the low-resolution color line sensor is large.

Figure 10A:
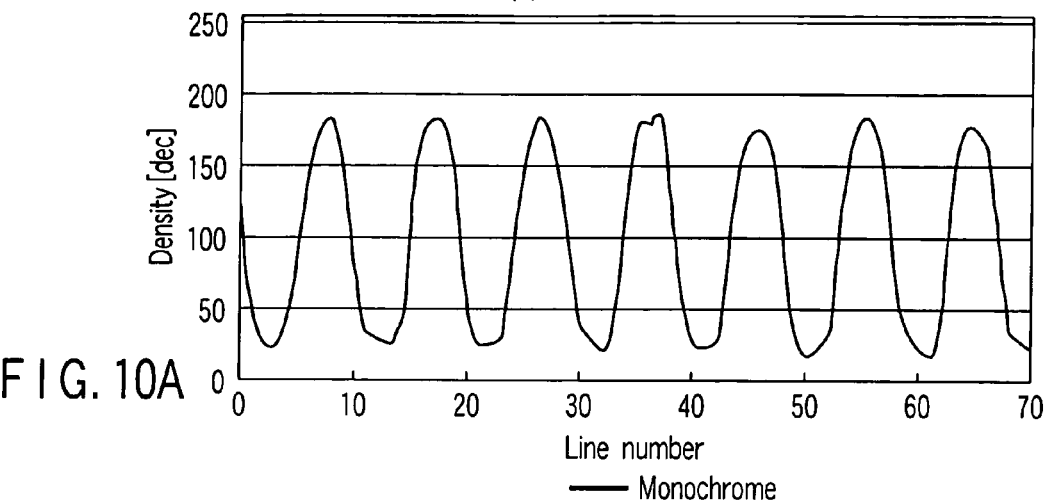
FIG. 10A is a diagram showing an example of an image read by a high resolution sensor for monochrome that is adjusted by the adjusting method shown in FIG. 9.
Figure 10B:
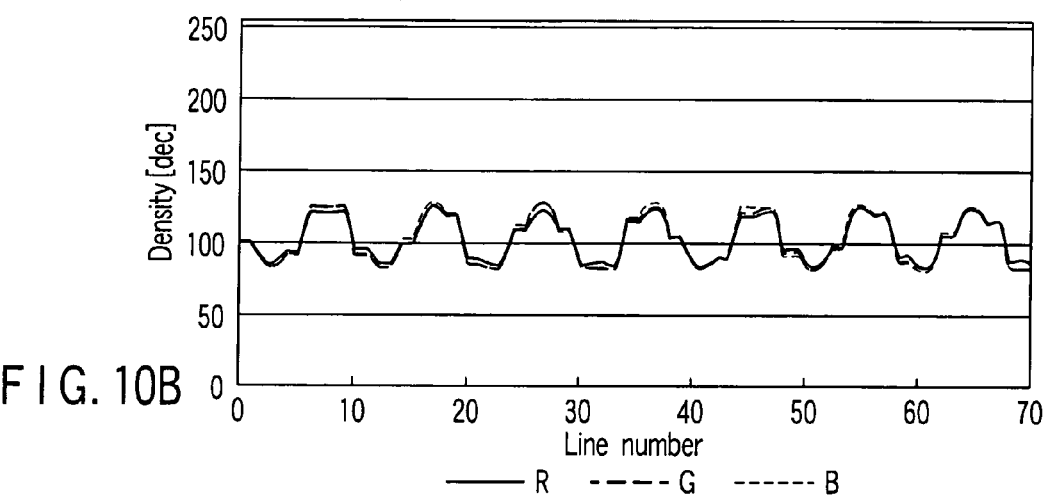
FIG. 10B is a diagram showing an example of an image read by a low-resolution RGB sensor for color that is adjusted by the adjusting method shown in FIG. 9.
Figure 10C:
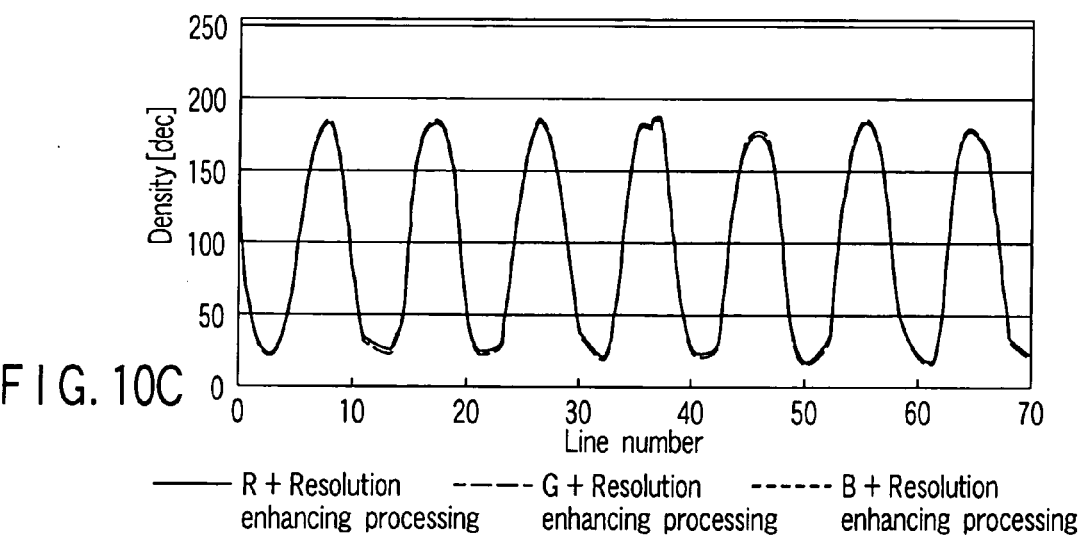
FIG. 10C is a diagram showing an image as a result of the composition of images shown in FIGS. 10A and 10A.

The graphs of FIGS. 10A to 10C correspond to the image corresponding to the amplitude of a sine wave extracted from a read signal which is achieved by reading a line pair pattern, that is, the MTF level.

In this example, MTF is set to the best position while the weight is given to the image read by the monochromatic line sensor, and no focus adjustment is carried out on the images read by the color line sensors. Therefore, it is apparent that as compared with the image based on the monochromatic line sensor shown in FIG. 10A, MTFs of the color line sensors shown in FIG. 10B are extremely lower.

The color data shown in FIG. 10B are corrected on the basis of the monochromatic data shown in FIG. 10A, thereby achieving the image shown in FIG. 10C. As is apparent from the comparison between FIG. 10C and FIG. 8C, both the data can be corrected at the same level.

Figure 11:
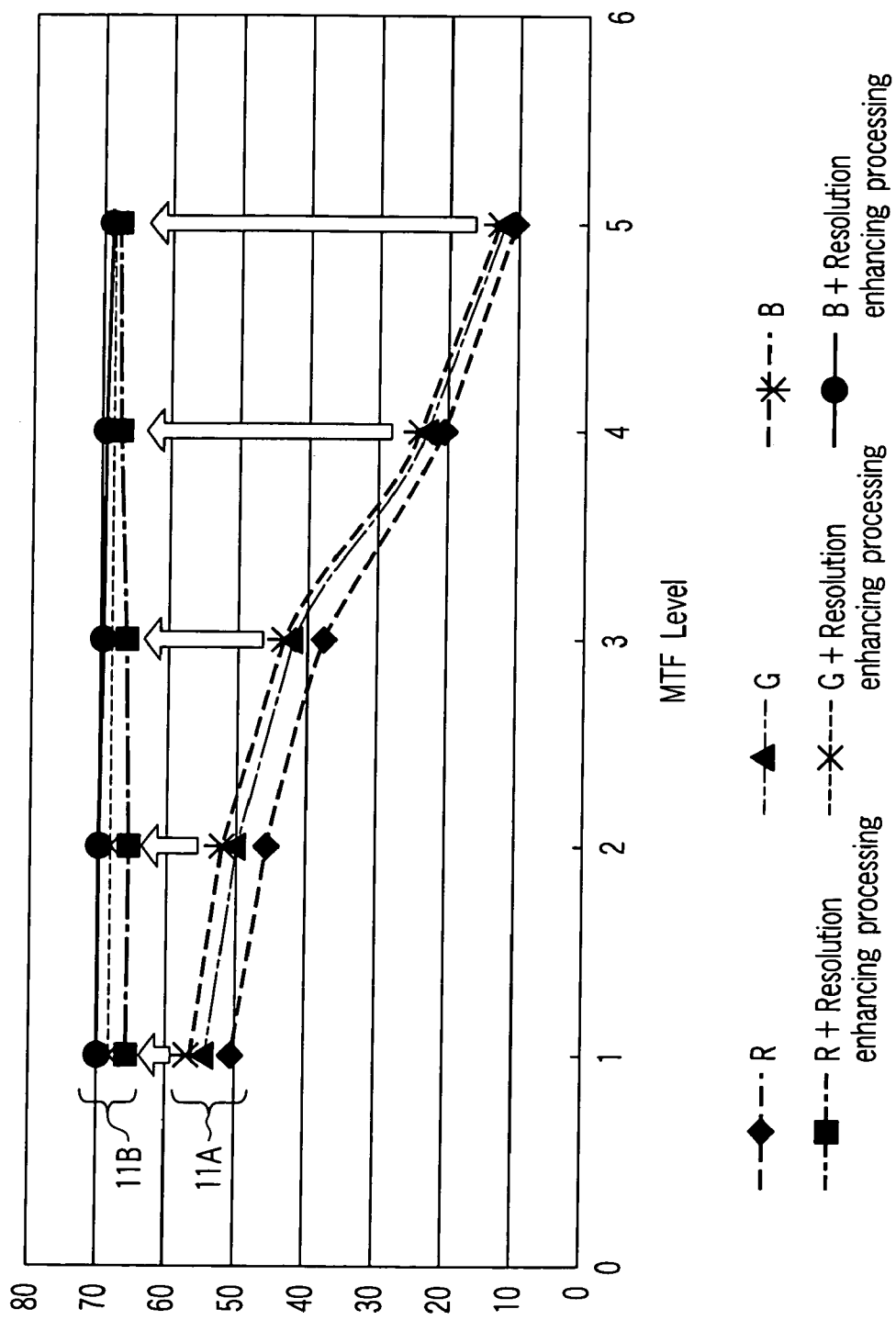
FIG. 11 is a diagram showing an experiment result in which the MTF level of an image read by the color line sensor is varied as a result of processing the output of the 4-line CCD sensor which is adjusted by the adjustment method shown in FIG. 9 through the high resolution processing described with reference to FIG. 6.

Likewise, the focus adjustment is carried out by mainly using the image read by the monochromatic sensor, and the MTF levels of the images read by the color line sensors are varied through the resolution enhancing processing. This experiment result is shown in FIG. 11. Respective MTF levels (11A) of the RGB line sensors are corrected to MTF levels (11B) by carrying out the resolution enhancing processing described with reference to FIG. 6.

When the color resolution enhancing processing is used in the scanner having the 4-line CCD sensor having the monochromatic line sensor and the color line sensor(s) which are different in the number of pixels and the focus adjustment is carried out on the basis of the image read by the monochromatic line sensor, the number of adjusting steps can be reduced, and an inexpensive lens can be used, so that the cost can be reduced.

According to the above-described method, in the image reading apparatus equipped with the 4-line CCD sensor including the color RGB line sensors and the monochromatic line sensor different in resolution (number of pixels) from the color RGB line sensors, the focus adjustment is carried out while the weight is given to the output signal achieved from the high-resolution sensor, whereby the number of adjusting steps can be reduced and an inexpensive lens can be used because color performance is not required to the lens, so that the cost can be reduced.

Figure 12:
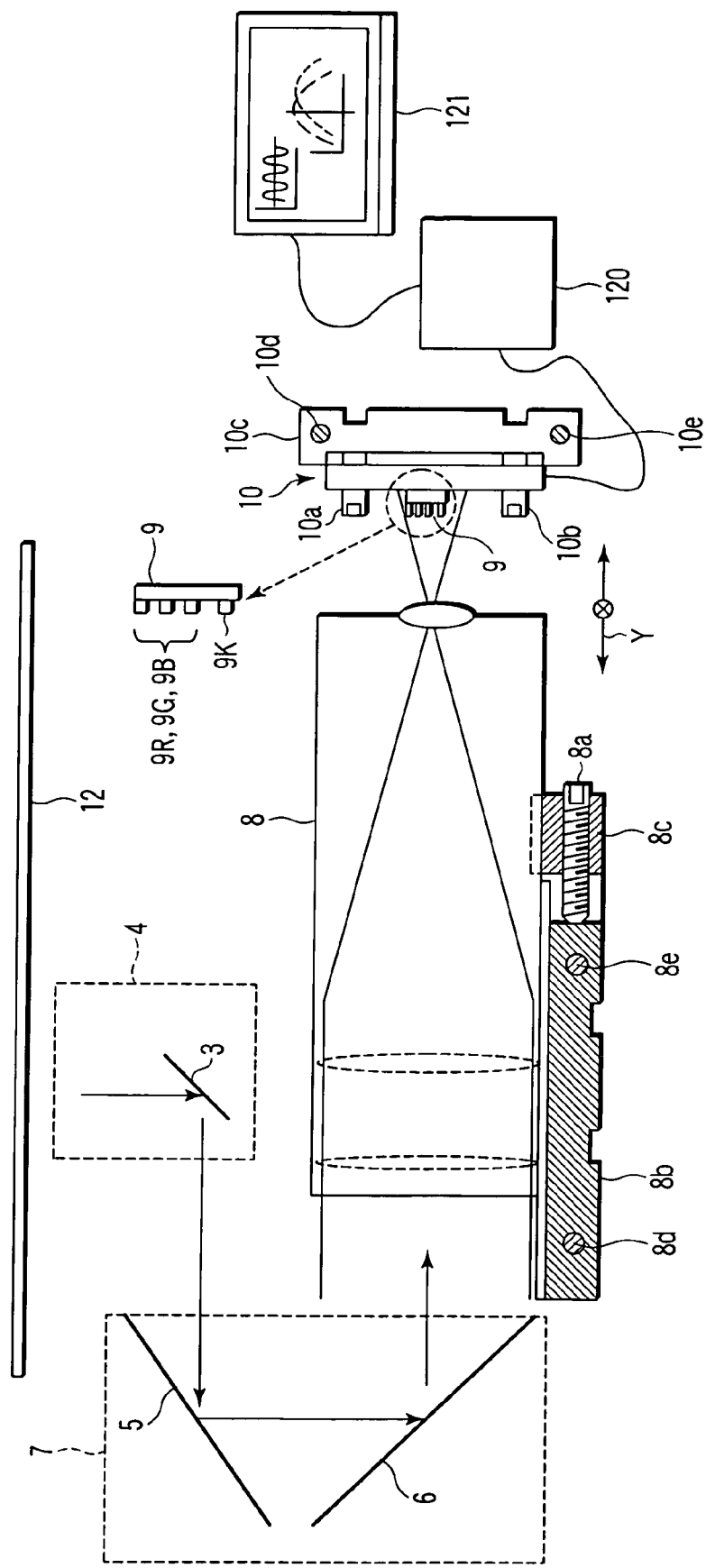
FIG. 12 is a diagram showing an example of a focus adjusting mechanism.

FIG. 12 shows an example of a focus adjusting mechanism. The same parts as shown in FIG. 1 are represented by the same reference numerals. Reference numeral 8a represents an adjusting screw, and reference numeral 8b represents a support table for supporting the body of the condenser lens 8. The condenser lens 8 is supported on the support table 8b so as to be slidable in the Y-axis direction. Reference numeral 8c represents a screw insertion portion provided to the condenser lens 8. When the adjusting screw 8a in the Y-axis direction is rotated, the condenser lens 8 is moved and adjusted in the Y-axis direction, whereby it is possible to carry out the focus adjustment described above.

Furthermore, an adjusting mechanism may be also provided to the CCD sensor 9 side. Adjusting screws 10a and 10b penetrate through the CCD sensor board 10 in the Y-axis direction and are screwed in a securing board 10c, whereby the CCD sensor board 10 is held. When the adjusting screws 10a and 10b are rotated, the CCD sensor board 10 is moved and adjusted in the Y-axis direction. Furthermore, the tilt, etc.

of the CCD sensor board 10 may be adjusted as occasion demands. Still furthermore, they may be also adjusted in the X-axis direction perpendicular to the Y-axis direction. For example, the securing board 10b is finely adjusted in the X-axis direction by rotating adjusting screws 10d and 10e in the X-axis direction which are provided to the securing board 10b. The securing board 10b is supported by a rail (not shown). Likewise, the support table 8b is finely adjusted in the X-axis direction by rotating adjusting screws 8d and 8e in the X-axis direction which are provided to the support table 8b. The support table 8b is supported by a rail (not shown).

The output of the monochromatic line sensor 9K when the line pair chart shown in FIG. 7 is read is processed in a controller 120 containing a color image processing circuit, and displayed as an image on a monitor 121. As the image may be displayed the graph of MTF shown in FIG. 9 or the read-out image of the line pair chart as shown in FIG. 10A. According to this apparatus, the adjusting work is completed by only the adjustment between the monochromatic line sensor 9K and the condenser lens 8.

FIG. 13 shows the adjusting process. MTF measurement at a first position in the horizontal direction of the monochromatic line sensor 9K is carried out (step SA1). At this time, the position in the X-axis direction is adjusted and fixed to the first position, and the distance between the lens and monochromatic line sensor in the Y-axis direction is varied. Subsequently, MTF measurement at a second position in the horizontal direction of the monochromatic line sensor 9K is likewise carried out (step SA2). Furthermore, MTF measurement at a third position in the horizontal direction of the monochromatic line sensor 9K is likewise carried out (step SA3). At this time point, three MTF curves relating to monochromatic outputs can be achieved as shown in FIG. 9. Then, the most balanced adjustment position is selected as a final adjustment-completed position PF4 (step SA4). That is, in the image reading apparatus having two or more line sensors having different numbers of pixels, the optical adjustment is carried out so that the resolution of the line sensor having the largest number of pixels is highest. At this time, plural MTFs 1, 2, 3 are measured at plural positions in the line direction of the monochromatic line sensor while varying the distance concerned. The distances corresponding to the respective maximum values of the plural measured MTFs (each distance corresponds to the distance between the condenser lens and the line sensor) are averaged, and the average distance is selected as the adjustment completion position PF4. Therefore, the adjustment can be performed in a balanced manner.

The present invention is not limited to the above-described embodiments, and the constituent elements of the embodiments may be modified at the stage of implementation of the invention without departing from the subject matter of the present invention. Furthermore, various inventions may be made by properly combining plural constituent elements disclosed in the above-described embodiments. For example, some constituent elements may be omitted from all the constituent elements disclosed in the embodiments. Furthermore, the constituent elements of the different embodiments may be suitably combined with one another.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image reading apparatus, comprising:
    an optical sensor having plural line sensors having different numbers of pixels;
    a condenser lens for projecting an optical image to the optical sensor; and
    an adjusting mechanism for setting the distance between the condenser lens and the optical sensor so that the resolution of the line sensor having the largest number of pixels is highest among the plural line sensors.

2. The image reading apparatus according to claim 1, wherein the line sensor having the largest number of pixels is a monochromatic line sensor equipped with no color filter for transmitting only specific wavelength light, and a line sensor having a smaller number of pixels is a color line sensor having a color filter for transmitting only specific wavelength light.

3. The image reading apparatus according to claim 1, wherein the adjusting mechanism sets the distance between the condenser lens and the optical sensor so that the maximum value of MTF showing a resolution characteristic of the line sensor having the largest number of pixels is higher than the maximum value of MTF showing a resolution characteristic of the line sensor having the smaller number of pixels.

4. The image reading apparatus according to claim 1, wherein the line sensor having the smaller number of pixels comprises three color line sensors having color filters for transmitting RED, GREEN and BLUE wavelength light, respectively.

5. The image reading apparatus according to claim 1, wherein the line sensor having the largest number of pixels is a monochromatic line sensor that is equipped with no color filter for transmitting only specific wavelength light and has a resolution of 600 dpi, and a line sensor having a smaller number of pixels comprises three color line sensors that are equipped with color filters for transmitting RED, GREEN and BLUE wavelength light respectively and have a resolution of 300 dpi.

6. A setting method for an image reading apparatus equipped with an optical sensor including plural line sensors having different numbers of pixels, a condenser lens for projecting an optical image to the optical sensor, and an adjusting mechanism for setting the distance between the condenser lens and the optical sensor, comprising:
    measuring plural MTFs of the line sensor having the largest number of pixels out of the plural line sensors at plural positions in a horizontal direction at plural times while varying the distance concerned; and
    selecting as an adjustment-completed position the average distance of the respective distances corresponding to the maximum values of the plural measured MTFs, the value of MTF at the adjustment-completed position being larger than the maximum values of MTFs of the other line sensors.

7. The setting method for the image reading apparatus according to claim 6, wherein a line pair chart having lines that are disposed so as to be spaced from one another at the interval corresponding to the pixel size of at least two pixels of the line sensor having the largest number of pixels is used as a line pair chart to achieve the optical image.

8. A setting method for an image reading apparatus equipped with a 4-line COD sensor that includes a monochromatic line sensor having the largest number of pixels and having no color filter, and three color line sensors having smaller number of pixels and having color filters of RED, GREEN and BLUE respectively, a condenser lens for projecting an optical image to the 4-line COD sensor, and an adjusting mechanism for setting the distance between the condenser lens and the optical sensor, comprising:

measuring plural MTFs at plural positions in the line direction of the monochromatic line sensor while varying the distance concerned; and selecting as an adjustment-completed position the average distance of the respective distances corresponding to the maximum values of the plural measured MTFs, the value of MTF at the adjustment-completed position being larger than the maximum values of MTFs of the other color line sensors.

9. The setting method for the image reading apparatus according to claim 8, wherein a line pair chart having lines that are disposed so as to be spaced from one another at the interval corresponding to the pixel size of at least two pixels of the monochromatic line sensor is used as a line pair chart to achieve the optical image.

10. The setting method for the image reading apparatus according to claim 8, wherein the distance concerned is varied by adjusting any one of the condenser lens and the 4-line COD sensor.

* * * * *